(12) United States Patent
Bain et al.

(10) Patent No.: US 11,580,089 B2
(45) Date of Patent: Feb. 14, 2023

(54) DATA MANAGEMENT SYSTEM

(71) Applicant: American Express Travel Related Services Company, Inc., New York, NY (US)

(72) Inventors: Anna Korsakova Bain, East Northport, NY (US); Atul Dalmia, Short Hills, NJ (US); Debasish Das, New York, NY (US); Karin Fourie, Peoria, AZ (US); Kavita Gupta, Jersey City, NJ (US); Gurusamy Ramasamy, Princeton, NJ (US); Jeremy David Seideman, Brooklyn, NY (US); Paramjit Singh, Scottsdale, AZ (US); Swatee Singh, Phoenix, AZ (US); Jennifer Tam, Rego Park, NY (US); Yan Zhang, Scarsdale, NY (US)

(73) Assignee: American Express Travel Related Services Company, INC., New York, NY (US)

( * ) Notice: Subject to any disclaimer, the term of this patent is extended or adjusted under 35 U.S.C. 154(b) by 877 days.

(21) Appl. No.: 16/419,725

(22) Filed: May 22, 2019

(65) Prior Publication Data

US 2020/0372081 A1 Nov. 26, 2020

(51) Int. Cl.
*G06F 16/23* (2019.01)
*G06F 7/02* (2006.01)
*G06N 20/00* (2019.01)

(52) U.S. Cl.
CPC .......... *G06F 16/2358* (2019.01); *G06F 7/023* (2013.01); *G06N 20/00* (2019.01)

(58) Field of Classification Search
CPC ............................ G06F 16/2358; G06F 7/023
See application file for complete search history.

(56) References Cited

U.S. PATENT DOCUMENTS

| | | | |
|---|---|---|---|
| 2008/0235746 A1* | 9/2008 | Peters ................ | H04N 21/6405 |
| | | | 348/E7.071 |
| 2015/0052610 A1* | 2/2015 | Thom .................. | G06F 21/121 |
| | | | 726/24 |
| 2019/0102718 A1* | 4/2019 | Agrawal .......... | G06Q 10/06315 |
| 2019/0236177 A1* | 8/2019 | Jain ........................ | G06F 17/18 |
| 2019/0392666 A1* | 12/2019 | Osborn ............... | G06Q 20/385 |

* cited by examiner

*Primary Examiner* — Tamara T Kyle
*Assistant Examiner* — Lahcen Ennaji
(74) *Attorney, Agent, or Firm* — Thomas | Horstemeyer, LLP

(57) ABSTRACT

The method includes receiving historical data from a first data source; analyzing the historical data for a desired characteristic; determining a representative value for the desired characteristic of the historical data; determining a first data expectation for the historical data based on the representative value; transmitting the first data expectation to a first data recipient; receiving first incoming data from the first data source; analyzing the desired characteristic of the first incoming data; determining a first incoming data value for the desired characteristic for the first incoming data; comparing the first incoming data value and the representative value; determining a first difference between the first incoming data value and the representative value; and/or comparing the first difference to a difference threshold which indicates whether a difference between an incoming data value and the representative value is significant.

18 Claims, 3 Drawing Sheets

DATA MANAGEMENT SYSTEM

FIELD

The present disclosure generally relates to data management and the determination of data characteristics.

BACKGROUND

Systems for receiving, processing, and/or distributing data may receive incoming data from various sources. The data received may comprise non-uniform characteristics, for example, based on the data source from which the data was received. Such non-uniform characteristics may include format, file size, required processing time, required ingestion time, arrival time, arrival frequency, and/or the like. Such data characteristics may vary between data received from the same data source. Therefore, it may be difficult to predict the characteristics of incoming data at different times and/or from different sources, thus adding uncertainty to subsequent data processing and distribution.

SUMMARY

A system, method, and article of manufacture (collectively, "the system") are disclosed relating to data management. In various embodiments, the system may be configured to perform operations including receiving, by a processor, historical data from a first data source; analyzing, by the processor, the historical data for a desired characteristic; determining, by the processor, a representative value for the desired characteristic of the historical data; determining, by the processor, a first data expectation for the historical data based on the representative value; transmitting, by the processor, the first data expectation to a first data recipient; receiving, by the processor, first incoming data from the first data source; analyzing, by the processor, the desired characteristic of the first incoming data; determining, by the processor, a first incoming data value for the desired characteristic for the first incoming data; comparing, by the processor, the first incoming data value and the representative value; determining, by the processor, a first difference between the first incoming data value and the representative value in response to the comparing the first incoming data value and the representative value; and/or comparing, by the processor, the first difference to a difference threshold which indicates whether a difference between an incoming data value and the representative value is significant. In various embodiments, the operations may further comprise determining, by the processor, a confidence score for the representative value in response to the analyzing the historical data for the desired characteristic and the determining the representative value for the desired characteristic for the historical data, wherein the confidence score indicates a level consistency of values within the historical data.

In various embodiments, the operations may further comprise transmitting, by the processor, an alert to the first data recipient of the first incoming data of the first difference in response to the first difference being outside the difference threshold. In various embodiments, the operations may further comprise transmitting, by the processor, an alert to a first data recipient in response to the receiving the first incoming data being delayed. In various embodiments, the operations may further comprise receiving, by the processor, second incoming data from the first data source; analyzing, by the processor, the desired characteristic of the second incoming data; determining, by the processor, a second incoming data value for the desired characteristic of the second incoming data; comparing, by the processor, the second incoming data value and the representative value; determining, by the processor, a second difference between the second incoming data value and the representative value in response to the comparing the second incoming data value and the representative value; and/or comparing, by the processor, the second difference to the difference threshold. In various embodiments, the operations may further comprise adjusting, by the processor, the representative value based on at least one of the second difference and the comparing the second difference to the difference threshold. In various embodiments, the operations may further comprise comparing, by the processor, the first difference and the second difference; comparing, by the processor, the first incoming data value and the second incoming data value; and/or adjusting, by the processor, the representative value based on at least one of the comparing the first difference and the second difference and the comparing the first incoming data value and the second incoming data value.

In various embodiments, the operations may further comprise receiving, by the processor, third incoming data from the first data source; analyzing, by the processor, the desired characteristic of the third incoming data; determining, by the processor, a third incoming data value for the desired characteristic for the third incoming data; comparing, by the processor, the third incoming data value and the adjusted representative value; determining, by the processor, a third difference between the third incoming data value and the adjusted representative value in response to the comparing the third incoming data value and the adjusted representative value; and/or comparing, by the processor, the third difference to the difference threshold.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

Figure 1:
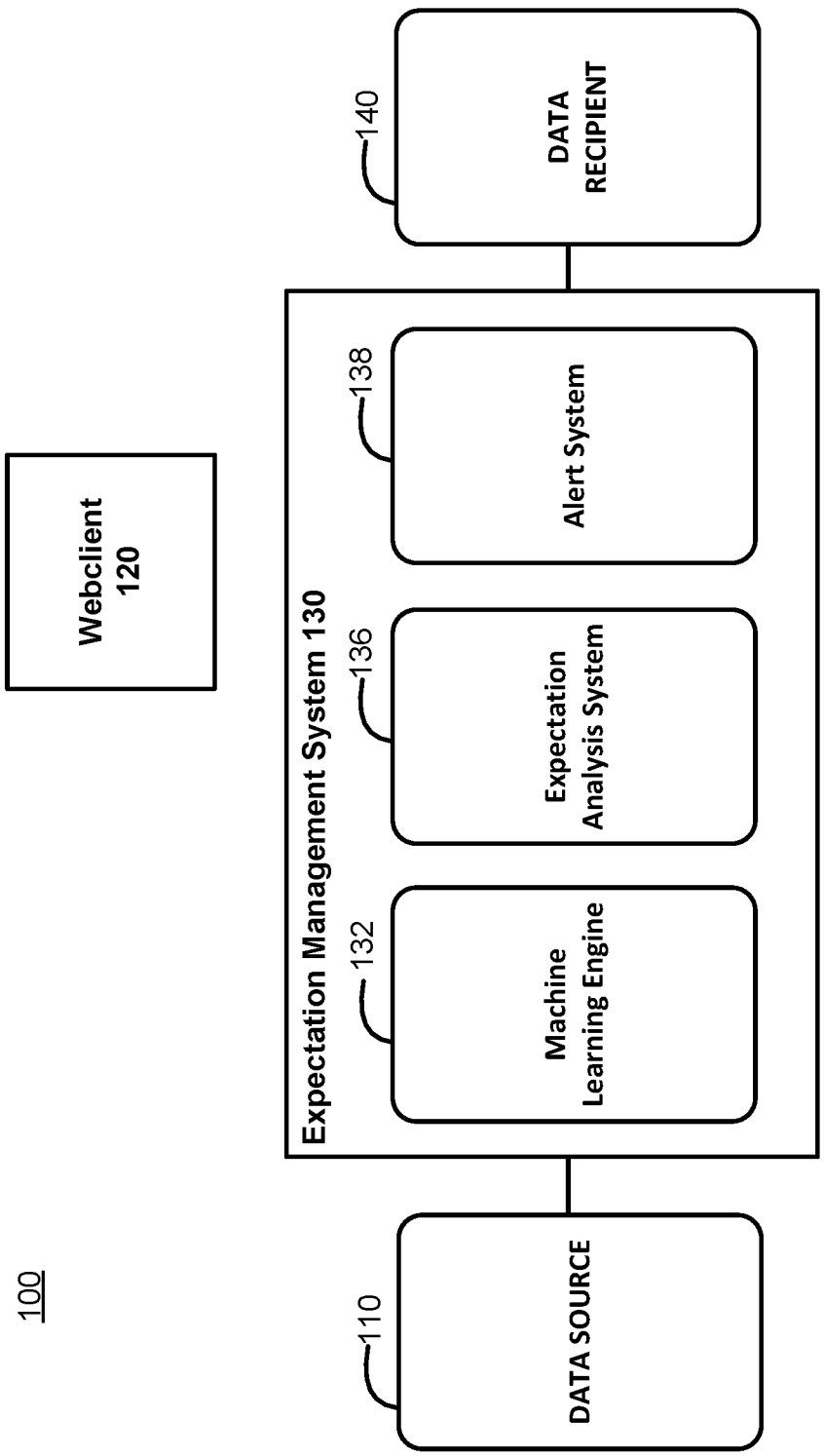
FIG. 1 shows an exemplary data management system, in accordance with various embodiments.

With reference to FIG. 1, in accordance with various embodiments, an exemplary data management system 100 is depicted. System 100 may comprise a data source 110, a web client 120, an expectation management system 130, and/or a data recipient 140. In operation, system 100 (and/or its components) may be configured to receive data, determine characteristics of the received data which are of interest or desired ("desired characteristics"), and/or determine values for the desired characteristics of the data. Additionally, based on the determined values for the desired characteristics of the data, system 100 may be configured to determine data expectations, which may be conveyed to data recipient(s) 140 who can use such data expectations to plan their data processing or utilization (or any other use of the received data). System 100, and any of the components comprised therein, may be computer-based, and may comprise a processor, a tangible non-transitory computer-readable memory, and/or a network interface. Instructions stored on the tangible non-transitory memory may allow system 100 or any of its components to perform various functions, as described herein.

In various embodiments, data source 110 may comprise hardware and/or software capable of storing data. For example, data source 110 may comprise a server appliance running a suitable server operating system (e.g., MICROSOFT INTERNET INFORMATION SERVICES or, "IIS") and having database software (e.g., ORACLE) installed thereon. In various embodiments, data source 110 may be a database which may store data, for example, associated with consumer or merchant account activity data, consumer or merchant profile data, transaction information (e.g., between consumers and merchants), or any other type of data. In various embodiments, the data from data source 110, which is received by expectation management system 130, may be big data, such that expectation management system 130 receives big data from data source 110. In various embodiments, system 100 may comprise multiple data sources 110, from which expectation management system 130 receives data. The aggregate data received by expectation management system 130 from data source(s) 110 may be big data.

The data received by expectation management system 130 from data source 110 may comprise various data characteristics (i.e., desired characteristics of the data) such as, for example, a data format (e.g., flat text, XML, CSV, JSON, and/or the like), a file size, data quality (e.g., completeness, fill rates, acceptable values and ranges, format, uniqueness, and/or the like), data reliability, required processing time, required ingestion time, arrival time, arrival frequency, and/or the like. Each data source 110 (in embodiments in which system 100 comprises multiple data sources 110) may transmit data to expectation management system 130 having a data characteristic(s) (i.e., desired characteristics) specific to the respective data source 110 and/or the data type. In various embodiments, data from a single data source 110 may comprise different desired characteristics.

In various embodiments, web client 120 may incorporate hardware and/or software components. For example, web client 120 may comprise a server appliance running a suitable server operating system (e.g., MICROSOFT INTERNET INFORMATION SERVICES or, "IIS"). Web client 120 may be any device that allows a user to communicate with a network (e.g., a personal computer, personal digital assistant (e.g., IPHONE®, BLACKBERRY®), tablet, cellular phone, kiosk, telephone, and/or the like). Web client 120 may be in electronic communication with data source 110, expectation management system 130, and/or data recipient 140.

Web client 120 includes any device (e.g., personal computer, mobile device, telephone, etc.) which communicates via any network, for example such as those discussed herein. In various embodiments, web client 120 may comprise and/or run a browser, such as MICROSOFT® INTERNET EXPLORER®, MOZILLA® FIREFOX®, GOOGLE® CHROME®, APPLE® Safari, or any other of the myriad software packages available for browsing the internet. For example, the browser may communicate with a server via a network by using Internet browsing software installed in the browser. The browser may comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various embodiments, browser may be configured to display an electronic channel.

In various embodiments, expectation management system 130 may comprise hardware and/or software capable of receiving, processing/ingesting, analyzing, distributing, and/or storing data. For example, expectation management system 130 may comprise a server appliance running a suitable server operating system (e.g., MICROSOFT INTERNET INFORMATION SERVICES or, "IIS") and having database software (e.g., ORACLE) installed thereon. Expectation management system 130 may be in electronic communication with data source 110, web client 120, and/or data recipient 140. In various embodiments, expectation management system 130 may comprise a machine learning engine 132, an expectation analysis system 136, and/or an alert system 138. The components of expectation management system 130 may be in electronic communication with one another and/or any component of system 100.

Figure 2:
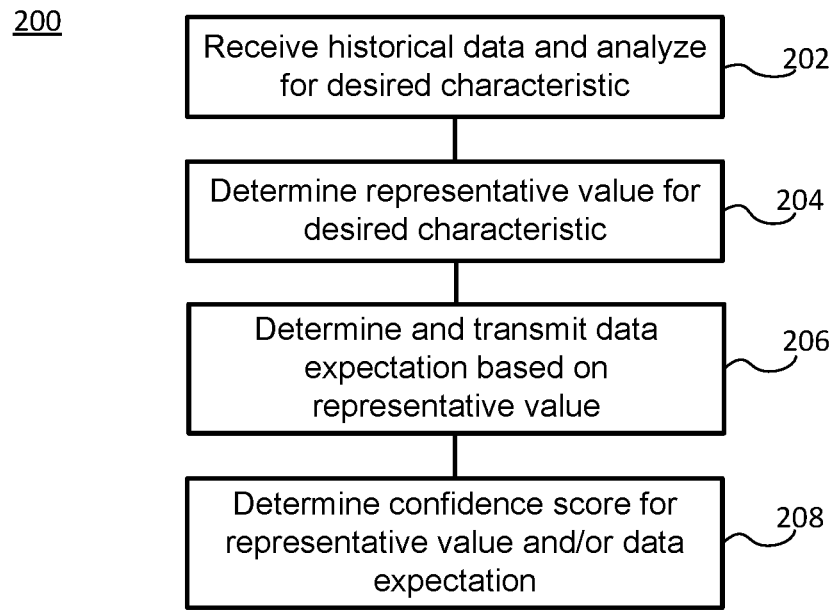
FIG. 2 shows a flowchart depicting an exemplary method for determining a data expectation, in accordance with various embodiments.

With additional reference to method 200 shown in FIG. 2, expectation management system 130 may receive data from data source 110, and expectation analysis system 136 may analyze the received data for desired characteristics of the data (step 202) and determine representative values for the desired characteristics (step 204). The desired characteristics may be characteristics of the data (e.g., data format, a file size, data quality, data reliability, required processing or ingestion time, arrival time, arrival frequency, and/or the like) which may affect how an end user of the data (i.e., data recipient 140) plans to utilize, and utilizes, the data. The data received by expectation management system 130 may be historical data and/or real time or near real time data. For example, expectation management system 130 may analyze historical data received by from data source 110 (step 202) for a desired characteristic involving file size. Based on the historical data from data source 110, expectation management system 130 and/or expectation analysis system 136 may determine a representative value for the file size desired characteristic of the historical data received.

In various embodiments, expectation management system 130 and/or expectation analysis system 136 may determine a representative value for a desired characteristic of data (step 204) in any suitable manner and/or by any suitable calculations. For example, a statistical function (e.g., standard deviation, frequency analysis such as TFxIDF, etc.) may be used to determine the representative value for a desired characteristic of data. As another example, expectation management system 130 and/or expectation analysis system 136 may determine an average, mode, and/or median of the values for the desired characteristic in the data. Continuing with the example involving determining a representative value for the file size desired characteristic of analyzed data, expectation management system 130 may determine the representative file size (i.e., the representative value for file size) of the received data (e.g., historical data) from data source 110. For example, the representative value for file size determined by expectation management system 130 and/or expectation analysis system 136 may be one gigabyte, which may be the average, median, and/or mode of the various file sizes in the historical data received from data source 110. In various embodiments, the representative value may comprise a single value and/or a range of values. The determined representative value for file size of the data may be specific to one or more data sources 110. The representative value for other desired characteristics such as data format may be, for example, the most common format type of data received from data source 110, or for data quality or reliability, the most common rating of the data quality or reliability (e.g., providing a data quality or reliability score between zero and one).

In various embodiments, expectation analysis system 136 may determine a data expectation (step 206), associated with the analyzed data and the desired characteristic, based on the determined representative value for the desired characteristic of the data. The data expectation may be, for example, equal to the representative value and/or may comprise a range of values incorporating the representative value. The data expectation may be transmitted to a data recipient 140, which may receive data from data source 110 (either directly or through expectation management system 130) for use or analysis of the data (e.g., for practical or commercial applications). The data expectation for the desired characteristic of the data may indicate to data recipient 140 what to expect from the data received regarding the associated desired characteristic (i.e., the data expectation may be a prediction of the value or state of the desired characteristic from the received data). For example, with a representative value of one gigabyte for the file size desired characteristic of data received from data source 110, expectation analysis system 136 may determine that the data expectation for file size may be at or around one gigabyte. Therefore, data recipient 140 of the data may expect the file size to be around or equal to one gigabyte based on receiving the data expectation from expectation management system 130, allowing data recipient 140 to plan accordingly for receiving future data from data source 110.

In various embodiments, expectation analysis system 136 may determine a confidence score for the determined representative value and/or the associated data expectation for a desired characteristic of data (step 208). The confidence score indicates the degree of certainty for a determined representative value and/or associated data expectation, and/or possible deviation from the representative value. A confidence score may be between a value of zero and one, where a confidence score of one represents perfect confidence in the determined representative value and/or associated data expectation. As an illustrative example, if historical data from a data source 110 indicates that all data batches had the same value for a desired characteristic, the resulting representative value would have an associated confidence score of 1 because there was no deviation from the common value of the desired characteristic.

In various embodiments, expectation analysis system 136 may comprise a confidence score threshold, which the confidence score associated with a representative value and/or data expectation for a desired characteristic must exceed in order for expectation analysis system 136 to use such a representative value and/or data expectation. For example, using the confidence score scale of zero to one discussed above, the confidence score threshold may be set at 0.7. Therefore, any representative values and/or data expectations for a desired characteristic of data determined by expectation analysis system 136 must receive a confidence score of at least 0.7 for expectation analysis system 136 to use the representative values and/or data expectations in operation.

In various embodiments, the data analyzed by expectation management system 130 and/or expectation analysis system 136 may comprise multiple desired characteristics for which respective representative values and data expectations are determined. For example, expectation management system 130 and/or expectation analysis system 136 may determine, representative values for desired characteristics including arrival time and arrival frequency of data from data source 110. Expectation management system 130 and/or expectation analysis system 13 may also determine data expectations for arrival time and arrival frequency based on the respective representative values. Therefore, data recipient 140 of the analyzed data may receive the data expectations for the desired characteristics of arrival time and arrival frequency, thus allowing data recipient 140 to plan use of the data as received in the future, in accordance with the data expectations. For example, expectation management system 130 and/or expectation analysis system 136 may determine the data expectations for arrival time and arrival frequency to be (and thus data recipient 140 may expect to receive data from data source 110 at) midnight on every seventh day (i.e., once a week), respectively.

After expectation management system 130 determines a representative value for a desired data characteristic of data, expectation management system 130 may continue to receive incoming data from data source 110, such that the values and respective representative values for desired characteristics of data may change over time. For example, data source 110 may change its data delivery time (i.e., arrival time at expectation management system 130), delivery frequency (i.e., arrival frequency at expectation management system 130), file size, and/or the like. This may cause the representative values for desired characteristics of the data (which may have been determined based on past or historical data) to change. Therefore, machine learning engine 132 may be configured to work in communication with expectation analysis system 136 to automatically adjust the representative value for a desired characteristic of data from data source 110 in response to the values for the desired characteristic of the data changing. This functionality allows expectation management system 130 to continuously update based on the dynamic nature of the data collected and received.

Figure 3:
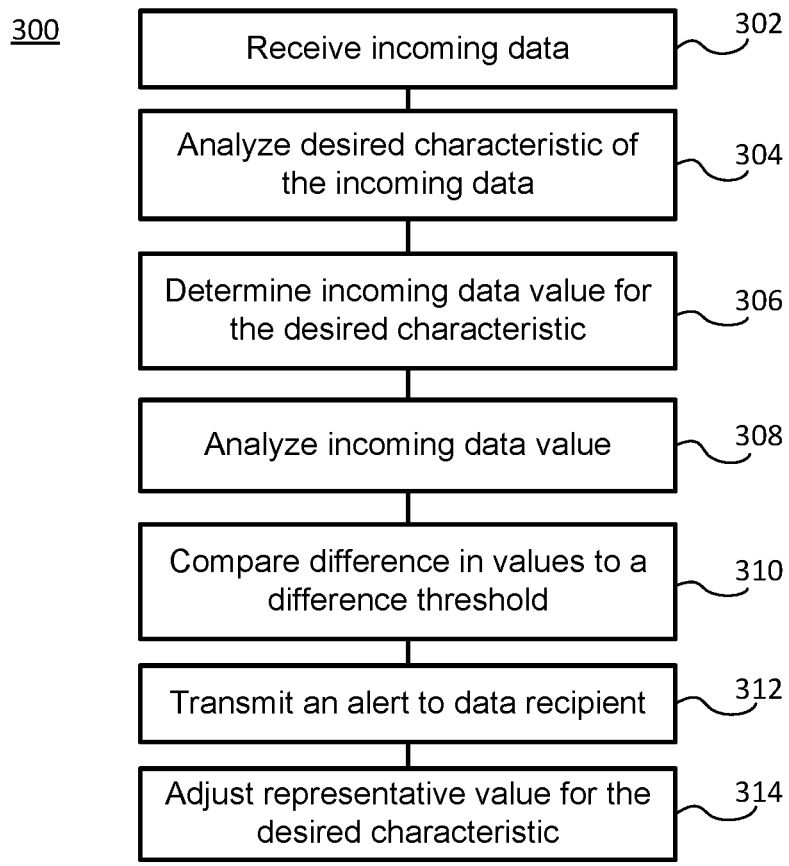
FIG. 3 shows a flowchart depicting an exemplary method for adjusting a representative value for a desired characteristic of data, in accordance with various embodiments.

With additional reference to method 300 in FIG. 3, in operation, as incoming data from data source 110 is received (step 302) by expectation management system 130, expectation analysis system 136 may analyze the incoming data for the desired characteristic (step 304). As a result, expectation analysis system 136 may determine an incoming data value for a desired characteristic of the incoming data (step 306). The incoming data value may be determined in the same or similar manner as the representative value for the desired characteristic is determined. In other words, the incoming data value may be thought of as the representative value for a desired characteristic specific to the incoming data batch.

In various embodiments, machine learning engine 132 and/or expectation analysis system 136 may analyze the incoming data value (step 308) to determine if the associated representative value for the desired characteristic should be adjusted. For example, expectation analysis system 136 may compare the incoming data value for a desired characteristic of the incoming data to the representative value for the same desired characteristic determined based on past data or history data, and determine if there is a difference. In response to the incoming data value for the desired characteristic differing significantly from the representative value for the same desired characteristic, machine learning engine 132 and/or expectation analysis system 136 may adjust the representative value to reflect the incoming data value (e.g., by adjusting the representative value to equal, or more closely resemble, the incoming data value).

In various embodiments, to determine whether a calculated difference between the incoming data value for the desired characteristic and the representative value for the same desired characteristic is significant, there may be a difference threshold. The difference threshold being exceeded by the calculated difference indicates that such a difference is significant and the representative value for the desired characteristic may need to be adjusted. Therefore, expectation analysis system 136 may compare the calculated difference (i.e., the difference in values) to the difference threshold (step 310), and adjust the representative value for the desired characteristic (step 314) accordingly.

The difference threshold may comprise any suitable measure or standard with which to determine the significance of a difference between an incoming data value and the associated representative value. For example, in various embodiments, a difference threshold may simply indicate that if a numerical value of a calculated difference between the incoming data value for a desired characteristic and the associated representative value is outside of (i.e., is higher or lower than) the numerical value of the difference threshold, the representative value for the desired characteristic may need to be adjusted. In various embodiments, a difference threshold may include a percentage difference from the representative value, such that if a calculated difference between an incoming data value and an associated representative value is a certain percentage different from the representative value, the representative value for the desired characteristic may need to be adjusted. In various embodiments, a difference threshold may be a percentage difference from the difference threshold, such that if a calculated difference between an incoming data value and an associated representative value is a certain percentage different from the difference threshold, the representative value for the desired characteristic may need to be adjusted. In various embodiments, a difference threshold may comprise a requisite number of times the calculated difference between the incoming data value and the associated representative value must be outside of the difference threshold, or consistent within a certain percentage, to indicate to machine learning engine 132 and/or expectation analysis system 136 that the representative value for the desired characteristic may need to be adjusted. In other words, a certain number of batches of incoming data (e.g., consecutive batches or a certain number of a total number of batches) from data source 110 would have to comprise an incoming data value for a desired characteristic having a difference from the associated representative value outside the indicated difference threshold and/or consistent with one another.

In various embodiments, as another example of expectation analysis system 136 analyzing the incoming data value (step 308), expectation analysis system 136 may compare the incoming data values for a desired characteristic of multiple data batches with one another. That is, for example, expectation analysis system 136 may determine a first incoming data value for a desired characteristic of a first data batch received from data source 110, and a second incoming data value for the desired characteristic of a second data batch received from data source 110, and compare the first incoming data value and the second incoming data value. Expectation analysis system 136 may determine a difference between incoming data values for a desired characteristic between data batches, and compare such a difference to an incoming data value difference threshold (another example of step 310). In response to the difference in incoming data values for a desired characteristic between data batches being outside of (e.g., being higher or lower than) the incoming data value difference threshold (similar to the difference threshold discussed in relation to comparing an incoming data value and the associated representative value), machine learning engine 132 and/or expectation analysis system 136 may adjust the representative value (step 314). The incoming data value difference threshold may comprise any suitable measure or standard with which to determine the significance of a difference between incoming data values for desired characteristics between different data batches, such as those discussed in relation to the difference threshold relating to a calculated difference between an incoming data value and the associated representative value.

In various embodiments, as yet another example of step 308 of method 300, expectation analysis system 136 may compare calculated differences for a desired characteristic from different batches of data to determine if the representative value of a desired characteristic should be updated. That is, for example, expectation analysis system 136 may determine a first calculated difference between a first incoming data value and the associated representative value for a desired characteristic of a first data batch received from data source 110, and a second calculated difference between a second incoming data value and the associated representative value for the desired characteristic of a second batch received from data source 110, and compare the first calculated difference and the second calculated difference. Expectation analysis system 136 may determine a difference between calculated differences between incoming data values and the representative value for a desired characteristic between data batches, and compare such a difference to an associated difference threshold (another example of step 310). In response to a difference in calculated differences (each calculated difference being the difference between the respective incoming data value and the representative value for a desired characteristic) between data batches being outside of (e.g., being higher or lower than) the associated difference threshold (similar to the difference threshold discussed in relation to comparing an incoming data value and the associated representative value), machine learning engine 132 and/or expectation analysis system 136 may adjust the representative value for the desired characteristic (step 314). For example, if the calculated difference for a desired characteristic from each data batch received from data source 110 remains consistent or keeps increasing, that may indicate to machine learning engine 132 and/or expectation analysis system 136 that the representative value for the desired characteristic should be updated. The difference threshold may comprise any suitable measure or standard with which to determine the significance of a difference between calculated differences for a desired characteristic in multiple data batches, such as those discussed in relation to the difference threshold relating to a calculated difference between an incoming data value and the associated representative value.

In response to any of the differences being deemed significant by machine learning engine 132 and/or expectation analysis system 136, alert system 138 may generate an alert to transmit to data recipient 140 (step 312). The alert may comprise information on how the received data differs from the representative value for a desired characteristic, if such a difference will adjust the representative value, and therefore, if the data expectation will be adjusted (which may affect data recipient's 140 expectations and plans for receiving and utilizing the data). An alert generated by alert system 138 may also comprise action items, such as future follow-up with data source 110 to determine if there is a problem, if an existing problem has been resolved, how the difference in data is being addressed, or to confirm that there should be an adjustment in the representative value for a desired characteristic and/or the associated data expectation. As an example of the above, if data source 110 sends data batches comprising about one gigabyte at midnight every night, then one day, data source 110 sends the data batch at 12:30 A.M. Thirty minutes past the representative value for delivery time (midnight) may be a significant difference (if the difference threshold is less than or equal to thirty minutes for the arrival time desired characteristic), and therefore, alert system 138 may generate and transmit an alert to the data recipient 140 awaiting the data batch that the data is late.

Continuing with this example, if the next three batches of data from data source 110 arrive between 12:40 and 12:50 A.M., this may cause the incoming data values for the arrival time desired characteristic of those three batches to be also between 12:40 and 12:50 A.M. The persistent calculated differences between the incoming data values for the arrival time desired characteristic and the associated representative value (i.e., expectation analysis system 136 comparing the calculated differences between data batches) may indicate that the representative value for the arrival time desired characteristic from this data source 110 should be updated to somewhere between, or a range of, 12:40 and 12:50 A.M. In various embodiments, expectation analysis system 136 may compare the incoming data values for the arrival time desired characteristic of the three batches, and determine the consistency warrants adjusting the associated representative value.

In various embodiments, the steps of methods 200 and 300 may be repeated multiple times, for example, each time expectation management system 130 receives data batches from data source 110. Thus, machine learning engine 132 and expectation analysis system 136 may continually adjust representative values for desired characteristics of data and the associated data expectations as the values of received data change. Accordingly, system 100 and expectation management system 130 may continually provide data recipient(s) 140 with the appropriate alerts and data expectations to accommodate the dynamic nature of data (e.g., big data) receipt and processing.

Figure 4:
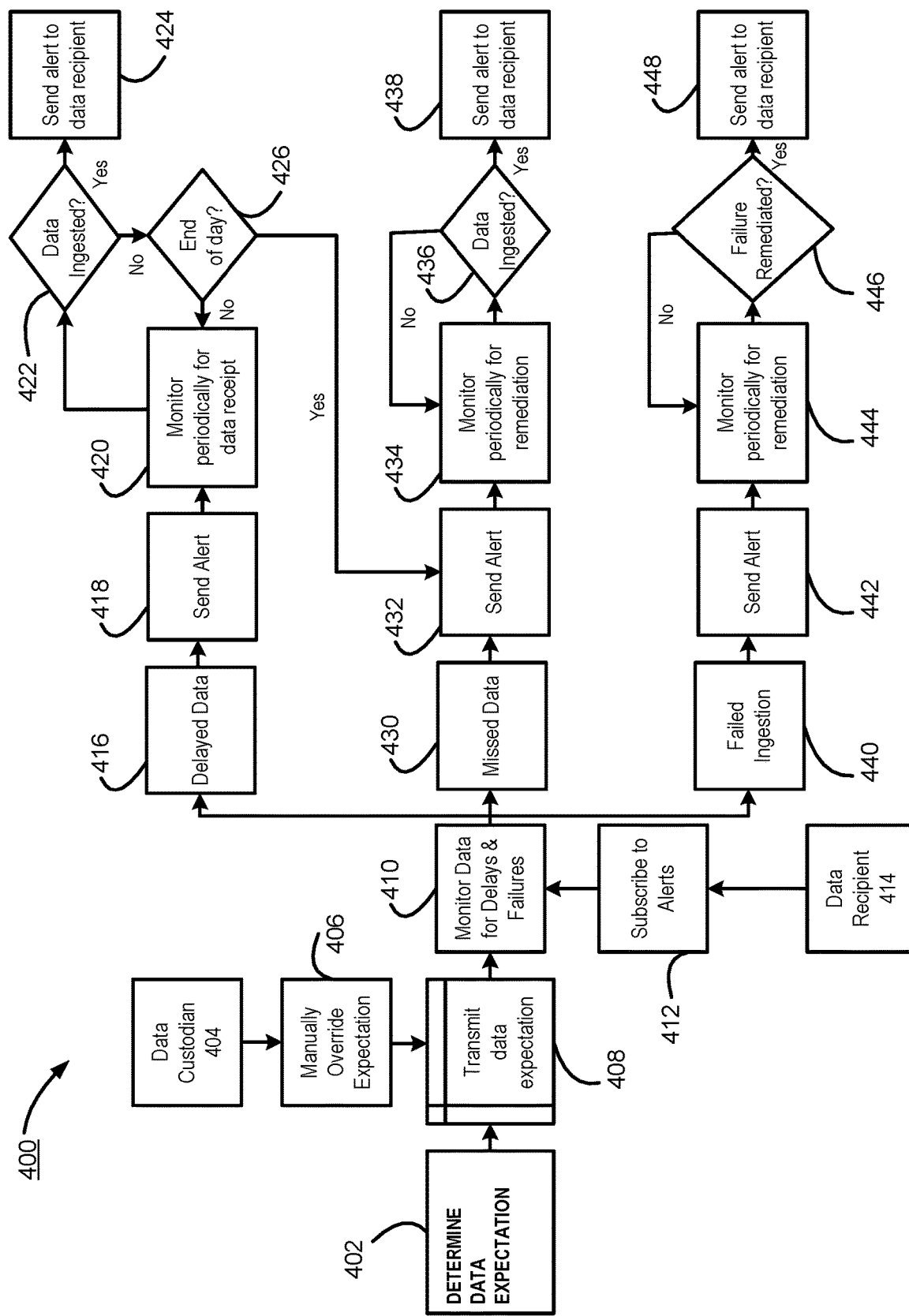
FIG. 4 shows a flowchart depicting an exemplary method for alerting data recipients using a data management system, in accordance with various embodiments.

As an illustration of the systems and methods described herein, FIG. 4 illustrates a flowchart depicting an exemplary method 400 for alerting data recipient(s) 140 using expectation management system 130, in accordance with various embodiments. Method 400 may relate to an arrival time desired characteristic of data received from data source 110. With additional reference to FIGS. 1 and 2-3, as discussed above in connection with methods 200 and 300 in FIGS. 2 and 3, respectively, expectation analysis system 136 may have determined a representative value for the arrival time desired characteristic of the data transmitted from data source 110, and in conjunction with machine learning engine 132, expectation analysis system 136 may have adjusted the representative value over time in accordance with changes in the data received. Based on the current representative value of the arrival time desired characteristic, expectation analysis system 136 may determine a data expectation for the arrival time of data (block 402), similar to step 206 in method 200. The data expectation for the arrival time desired characteristic may be transmitted (block 408) to data recipient 140 so data recipient 140 may adjust its schedule and/or make plans to utilize the data in accordance with the data expectations. The data expectation may also set a service standard for expectation management system 130 to strive to meet. For example, if the data expectation transmitted to data recipient 140 indicates that data from data source 110 will arrive to data recipient 140 at midnight on a certain day, then expectation management system 130 may work to conduct any necessary processing on the incoming data or follow-up with data source 110 such that data recipient 140 receives the incoming data in accordance with data expectation.

In various embodiments, a data custodian 404 may oversee the determination and transmission of data expectations for desired characteristics. Data custodian 404 may, under appropriate circumstances, manually override the data expectation (block 406) for a desired characteristic so an alert is not sent to data recipient 140 advising of the incoming data differing from the data expectation. For example, if the incoming data value for the arrival time desired characteristic of an incoming data batch does not meet the associated data expectation as a result of an unforeseen issue in system 100, data recipient 140 has requested not to receive alerts during a time period, and/or the like, data custodian 404 may manually override the data expectation (block 406).

Based on the determined and transmitted data expectation for the arrival time desired characteristic, expectation analysis system 136 may monitor incoming data for delays and/or failures (block 410). A data failure may, for example, comprise incoming data being received, but for some reason failing to be ingested by expectation management system 130 (e.g., because of poor data quality, unknown format, or the like). Monitoring the incoming data for delays and/or failures (block 410) may comprise expectation analysis system 136 determining an incoming data value for the arrival time desired characteristic, and comparing it to the associated representative value (e.g., midnight on a certain day), as described above in relation to steps 306 and 308 of method 300.

The data recipient 414 (similar to data recipient 140 in FIG. 1) may subscribe to receive alerts (block 412) regarding the status of incoming data including delays and failures, the alerts being similar to those described in relation to step 312 of method 300.

As described in relation to step 310 of method 300, expectation analysis system 136 may determine if a calculated difference between the incoming data value for the arrival time desired characteristic of the incoming data and the associated representative value is significant by comparing the calculated difference to an associated difference threshold. For example, if the incoming data was received by expectation management system 130 five minutes late, or the incoming data has not been received five minutes after the arrival time representative value (e.g., midnight), the incoming data value for the arrival time desired characteristic would be 12:05 A.M. Therefore, the calculated difference between the incoming data value (12:05 A.M.) and the representative value (midnight) would be five minutes. If the difference threshold is ten minutes, expectation analysis system 136 may determine that the calculated difference of five minutes is not outside the difference threshold of ten minutes, and therefore, not significant. In response, alert system 138 may not generate an alert to send to data recipient 414.

Continuing with the above example, in response to delayed data 416 (e.g., data that has not yet been received by expectation management system 130 past the representative value, or data that was received after the representative value (i.e., late received data)) from data source 110, alert system 138 may transmit an alert (block 418) to data recipient 414. To reiterate, an alert may be transmitted in response to the delay being significant (i.e., the calculated difference between the incoming data value (e.g., the amount of time delayed without receipt or the late time received) and the associated representative value for arrival time being above a difference threshold). The alert may inform data recipient 414 of the delay in data receipt to allow data recipient 414 to adjust plans accordingly.

In various embodiments, expectation management system 130 and/or expectation analysis system 136 may monitor periodically for data receipt (block 420). For example, expectation management system 130 and/or expectation analysis system 136 may monitor and/or follow-up with data source 110 every thirty minutes to see if the data has been sent by data source 110 and/or received by expectation management system 130. Expectation management system 130 may send a follow-up alert to data recipient 414 periodically to advise of the status of the data (e.g., every time expectation management system 130 and/or expectation analysis system 136 conducts follow-up, or any other suitable time interval). After monitoring for data receipt (block 420), expectation management system 130 and/or expectation analysis system 136 may determine if the incoming data has been received and/or ingested (block 422). If the incoming data has been received, alert system 138 may send an update to data recipient 414 (block 424) advising that the expected incoming data has been received (i.e., an alert advising of data receipt), and data recipient 414 may obtain the data. If the incoming data has not been received, expectation management system 130 and/or expectation analysis system 136 may determine if the day is over (block 426) (e.g., the business day for the data recipient 414, or any other relevant measure of a day or other suitable time interval). In response to the day not being over (a "no" response to block 426), expectation management system 130 and/or expectation analysis system 136 may continue to monitor periodically for data receipt (block 420), and repeat blocks 422, 424, and 426 as appropriate.

In response to the day being over after monitoring for the delayed data ("yes" response to block 426), the delayed data 416 may be deemed missed data 430, and alert system 138 may send an alert (block 432) advising data recipient 414 of the same. Similar to block 420, expectation management system 130 and/or expectation analysis system 136 may monitor periodically for remediation (block 434) of the problem relating to missed data 430 (e.g., every thirty minutes, check if expectation management system 130 has received the incoming data). Expectation management system 130 may send a follow-up alert to data recipient 414 periodically to advise of the status of the data (e.g., every time expectation management system 130 and/or expectation analysis system 136 conducts follow-up, or any other suitable time interval). After monitoring for receipt of the missing data (block 434), expectation management system 130 and/or expectation analysis system 136 may determine if missed data 430 has been received and/or ingested (block 436). If missed data 430 has been received, alert system 138 may send an alert to data recipient 414 (block 438) advising that the expected incoming data has been received (i.e., an alert advising of data receipt). If missed data 430 has still not been received/ingested, expectation management system 130 and/or expectation analysis system 136 may continue to monitor periodically for remediation of the missed data 430 problem (block 434), and repeat blocks 432, 434, and 436 as appropriate.

In response to expectation management system 130 receiving incoming data, but failing to ingest the incoming data (block 440) (e.g., because of data quality or formatting issues), alert system 138 may send an alert (block 442) advising data recipient 414 of the same. Similar to blocks 420 and 434, expectation management system 130 and/or expectation analysis system 136 may monitor periodically for remediation (block 444) of the failed data ingestion (e.g., every thirty minutes, check if expectation management system 130 has ingested the incoming data). Expectation management system 130 may send a follow-up alert to data recipient 414 periodically to advise of the status of the data (e.g., every time expectation management system 130 and/or expectation analysis system 136 conducts follow-up, or any other suitable time interval). After monitoring for data ingestion (block 444), expectation management system 130 and/or expectation analysis system 136 may determine if the failed data ingestion has been remediated (block 446) and data has been ingested. If the data has been ingested, alert system 138 may send an update to data recipient 414 (block 448) advising that the expected incoming data has been received (i.e., an alert advising of data receipt). If the data has still not been ingested, expectation management system 130 and/or expectation analysis system 136 may continue to monitor periodically for remediation of the data ingestion problem (block 444), and repeat blocks 424, 444, and/or 446 as appropriate.

The monitoring by the systems and methods described herein allow for data recipients to remain apprised of the status of data they are expecting. Additionally, as described above, expectation management system 130 may automatically (via machine learning engine 132) and continuously update representative values for desired characteristics of incoming data as it changes over time, and as a result, continuously update the associated data expectations. Accordingly, data recipients may maintain accurate data expectations regarding desired characteristics of the data (e.g., file size, format, data quality, required processing or ingestion time, arrival time, arrival frequency, and/or the like), and plan the use of the incoming data accordingly.

The methods and systems described herein improve the functioning of the computer. For example, by expectation management system 130 automatically and continuously updating representative values and data expectations for a desired characteristic of data, the other components or processors of system 100 may more efficiently allocate processing resources based on the data expectations for desired characteristics of the data. Additionally, expectation management system 130, and machine learning engine 132 therein, allows system 100 to automatically and readily adapt to changing values and characteristics in data, which is especially valuable given the dynamic nature of data over time. That way, manual resources are not required to keep representative values and data expectations for desired characteristics current, which would require tedious surveying and analysis of continuously-received and continuously-changing data. Even further, system 100 and/or expectation management system 130 may presumptively allocate storage space (e.g., in a database in system 100 and/or expectation management system 130) in anticipation of incoming data, which expectation management system 130 predicts based on associated data characteristics and data expectations. Accordingly, storage space may be allocated to support multiple processes and data feeds more optimally. Even further, system 100 and/or expectation management system 130 may decrease waiting time and/or optimize scheduled processes of data because system 100 and/or expectation management system 130 may provide data recipient(s) 140 with data expectations. Accordingly, the data recipient(s) 140 may reactively change processing schedules based on data expectations and data expectation changes from system 100 and/or expectation management system 130.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a desired characteristic of data, (ii) a representative value, and/or (iii) a data expectation. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The process flows depicted in FIGS. 2-4 are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-4, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at www.csrc.nist.gov/publications/nistpubs/800-145/SP800-145 (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

What is claimed is:

1. A method, comprising;
receiving, by a processor, historical data from a first data source;
analyzing, by the processor, the historical data for a desired characteristic;
determining, by the processor, a representative value for the desired characteristic of the historical data;
determining, by the processor, a first data expectation for the historical data based on the representative value, the first data expectation representing what to expect from the data received regarding the desired characteristic;
transmitting, by the processor, the first data expectation to a first data recipient;
receiving, by the processor, first incoming data from the first data source;
analyzing, by the processor, the desired characteristic of the first incoming data;
determining, by the processor, a first incoming data value for the desired characteristic for the first incoming data;
comparing, by the processor, the first incoming data value and the representative value;
determining, by the processor, a first difference between the first incoming data value and the representative value in response to the comparing the first incoming data value and the representative value;
comparing, by the processor, the first difference to a difference threshold which indicates whether a difference between an incoming data value and the representative value is significant;
receiving, by the processor, second incoming data from the first data source;
analyzing, by the processor, the desired characteristic of the second incoming data;
determining, by the processor, a second incoming data value for the desired characteristic of the second incoming data;
comparing, by the processor, the second incoming data value and the representative value;
determining, by the processor, a second difference between the second incoming data value and the representative value in response to the comparing the second incoming data value and the representative value;
comparing, by the processor, the second difference to the difference threshold;
comparing, by the processor, the first difference and the second difference;
comparing, by the processor, the first incoming data value and the second incoming data value; and
adjusting, by the processor, the representative value based on at least one of the comparing the first difference and the second difference and the comparing the first incoming data value and the second incoming data value.

2. The method of claim 1, further comprising:
transmitting, by the processor, an alert to the first data recipient of the first incoming data of the first difference in response to the first difference being outside the difference threshold.

3. The method of claim 1, further comprising:
transmitting, by the processor, an alert to a first data recipient in response to the receiving the first incoming data being delayed.

4. The method of claim 1, further comprising:
adjusting, by the processor, the representative value based on at least one of the second difference and the comparing the second difference to the difference threshold.

5. The method of claim 1, further comprising:
receiving, by the processor, third incoming data from the first data source; analyzing, by the processor, the desired characteristic of the third incoming data;
determining, by the processor, a third incoming data value for the desired characteristic for the third incoming data;
comparing, by the processor, the third incoming data value and the adjusted representative value;

determining, by the processor, a third difference between the third incoming data value and the adjusted representative value in response to the comparing the third incoming data value and the adjusted representative value; and comparing, by the processor, the third difference to the difference threshold.

6. The method of claim 1, further comprising:
determining, by the processor, a confidence score for the representative value in response to the analyzing the historical data for the desired characteristic and the determining the representative value for the desired characteristic for the historical data, wherein the confidence score indicates a level consistency of values within the historical data.

7. An article of manufacture including a non-transitory, tangible computer readable storage medium having instructions stored thereon that, in response to execution by a processor of a processing machine, cause the processor to perform operations comprising:
receiving, by the processor, historical data from a first data source;
analyzing, by the processor, the historical data for a desired characteristic;
determining, by the processor, a representative value for the desired characteristic of the historical data;
determining, by the processor, a first data expectation for the historical data based on the representative value
transmitting, by the processor, the first data expectation to a first data recipient, the first data expectation representing what to expect from the data received regarding the desired characteristic;
receiving, by the processor, first incoming data from the first data source;
analyzing, by the processor, the desired characteristic of the first incoming data;
determining, by the processor, a first incoming data value for the desired characteristic for the first incoming data;
comparing, by the processor, the first incoming data value and the representative value;
determining, by the processor, a first difference between the first incoming data value and the representative value in response to the comparing the first incoming data value and the representative value;
comparing, by the processor, the first difference to a difference threshold which indicates whether a difference between an incoming data value and the representative value is significant;
receiving, by the processor, second incoming data from the first data source;
analyzing, by the processor, the desired characteristic of the second incoming data;
determining, by the processor, a second incoming data value for the desired characteristic of the second incoming data;
comparing, by the processor, the second incoming data value and the representative value;
determining, by the processor, a second difference between the second incoming data value and the representative value in response to the comparing the second incoming data value and the representative value;
comparing, by the processor, the second difference to the difference threshold;
comparing, by the processor, the first difference and the second difference;

comparing, by the processor, the first incoming data value and the second incoming data value; and
adjusting, by the processor, the representative value based on at least one of the comparing the first difference and the second difference and the comparing the first incoming data value and the second incoming data value.

8. The article of claim 7, wherein the operations further comprise:
transmitting, by the processor, an alert to the first data recipient of the first incoming data of the first difference in response to the first difference being outside the difference threshold.

9. The article of claim 7, wherein the operations further comprise:
transmitting, by the processor, an alert to a first data recipient in response to the receiving the first incoming data being delayed.

10. The article of claim 7, wherein the operations further comprise:
adjusting, by the processor, the representative value based on at least one of the second difference and the comparing the second difference to the difference threshold.

11. The article of claim 7, wherein the operations further comprise:
receiving, by the processor, third incoming data from the first data source;
analyzing, by the processor, the desired characteristic of the third incoming data;
determining, by the processor, a third incoming data value for the desired characteristic for the third incoming data;
comparing, by the processor, the third incoming data value and the adjusted representative value;
determining, by the processor, a third difference between the third incoming data value and the adjusted representative value in response to the comparing the third incoming data value and the adjusted representative value; and
comparing, by the processor, the third difference to the difference threshold.

12. The article of claim 7, wherein the operations further comprise:
determining, by the processor, a confidence score for the representative value in response to the analyzing the historical data for the desired characteristic and the determining the representative value for the desired characteristic for the historical data, wherein the confidence score indicates a level consistency of values within the historical data.

13. A system comprising:
a processor of a processing machine,
a tangible, non-transitory memory configured to communicate with the processor,
the tangible, non-transitory memory having instructions stored thereon that, in response to execution by the processor, cause the processor to perform operations comprising:
receiving, by the processor, historical data from a first data source; analyzing, by the processor, the historical data for a desired determining, by the processor, a representative value for the desired characteristic of the historical data;
determining, by the processor, a first data expectation for the historical data based on the representative value transmitting, by the processor, the first data expectation to a first data recipient, the first data expectation representing what to expect from the data received regarding the desired characteristic;

receiving, by the processor, first incoming data from the first data source;

analyzing, by the processor, the desired characteristic of the first incoming data;

determining, by the processor, a first incoming data value for the desired characteristic for the first incoming data;

comparing, by the processor, the first incoming data value and the representative value;

determining, by the processor, a first difference between the first incoming data value and the representative value in response to the comparing the first incoming data value and the representative value; and comparing, by the processor, the first difference to a difference threshold which indicates whether a difference between an incoming data value and the representative value is significant;

receiving, by the processor, second incoming data from the first data source;

analyzing, by the processor, the desired characteristic of the second incoming data;

determining, by the processor, a second incoming data value for the desired characteristic of the second incoming data;

comparing, by the processor, the second incoming data value and the representative value;

determining, by the processor, a second difference between the second incoming data value and the representative value in response to the comparing the second incoming data value and the representative value;

comparing, by the processor, the second difference to the difference threshold;

adjusting, by the processor, the representative value based on at least one of the second difference and the comparing the second difference to the difference threshold;

comparing, by the processor, the first difference and the second difference;

comparing, by the processor, the first incoming data value and the second incoming data value; and adjusting, by the processor, the representative value based on at least one of the comparing the first difference and the second difference and the comparing the first incoming data value and the second incoming data value.

14. The system of claim 13, wherein the operations further comprise:

transmitting, by the processor, an alert to the first data recipient of the first incoming data of the first difference in response to the first difference being outside the difference threshold.

15. The system of claim 13, wherein the operations further comprise:

adjusting, by the processor, the representative value based on at least one of the second difference and the comparing the second difference to the difference threshold.

16. The system of claim 13, wherein the operations further comprise:

transmitting, by the processor, an alert to a first data recipient in response to the receiving the first incoming data being delayed.

17. The system of claim 13, wherein the operations further comprise:

receiving, by the processor, third incoming data from the first data source;

analyzing, by the processor, the desired characteristic of the third incoming data;

determining, by the processor, a third incoming data value for the desired characteristic for the third incoming data;

comparing, by the processor, the third incoming data value and the adjusted representative value;

determining, by the processor, a third difference between the third incoming data value and the adjusted representative value in response to the comparing the third incoming data value and the adjusted representative value; and comparing, by the processor, the third difference to the difference threshold.

18. The system of claim 13, wherein the operations further comprise:

determining, by the processor, a confidence score for the representative value in response to the analyzing the historical data for the desired characteristic and the determining the representative value for the desired characteristic for the historical data, wherein the confidence score indicates a level consistency of values within the historical data.

* * * * *